United States Patent
Heiderscheit (10) Patent No.: US 8,660,526 B1
(45) Date of Patent: Feb. 25, 2014

(54) LOCATION-BASED INTRUSION DETECTION SYSTEM

(75) Inventor: David D. Heiderscheit, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1253 days.

(21) Appl. No.: 11/166,698

(22) Filed: Jun. 24, 2005

(51) Int. Cl.
*H04M 1/66* (2006.01)

(52) U.S. Cl.
USPC ...... 455/410; 455/411; 455/456.1; 455/404.2

(58) Field of Classification Search
USPC ............................ 455/410, 411, 456.1, 404.2
See application file for complete search history.

(56) References Cited

U.S. PATENT DOCUMENTS

| | | | | |
|---|---|---|---|---|
| 5,535,431 | A * | 7/1996 | Grube et al. | 455/411 |
| 6,097,938 | A * | 8/2000 | Paxson | 455/410 |
| 6,385,454 | B1 * | 5/2002 | Bahl et al. | 455/450 |
| 7,215,966 | B2 * | 5/2007 | Joshi | 455/456.1 |
| 2003/0210807 | A1 * | 11/2003 | Sato et al. | 382/104 |
| 2004/0023637 | A1 * | 2/2004 | Johnson et al. | 455/405 |
| 2005/0136891 | A1 * | 6/2005 | Wang et al. | 455/410 |
| 2005/0248480 | A1 * | 11/2005 | Butler et al. | 342/45 |
| 2006/0281473 | A1 * | 12/2006 | Debany et al. | 455/456.2 |

OTHER PUBLICATIONS

"What is IP spoofing?—A Word Definition From the Webopedia Computer Dictionary" [online], [retrieved on Jun. 3, 2005]. Retrieved from the Internet: <URL: http://www.webopedia.com/TERM/I/IP_spoofing.html >.

* cited by examiner

*Primary Examiner* — Wayne Cai
*Assistant Examiner* — Shantell L Heiber
(74) *Attorney, Agent, or Firm* — Donna P. Suchy; Daniel M. Barbieri (57) ABSTRACT

A method of detecting messages from an unwanted source in an ad-hoc network is disclosed. According to the method, a first message is received that purports to be from a mobile communication device. The first purported message has a first location component incorporated therein. A second message is received that purports to be from the mobile communication device. The second message has a second location component incorporated therein. The first location component is compared with the second location component. It is determined that one of the first purported message and the second purported message is not from the mobile communication device when the first location component is inconsistent with the second location component.

20 Claims, 5 Drawing Sheets

LOCATION-BASED INTRUSION DETECTION SYSTEM

FIELD OF THE INVENTION

The invention relates to mobile communications networks, and more particularly, to methods of maintaining the security and integrity of mobile communications networks.

BACKGROUND OF THE INVENTION

Ad-hoc networks are groups of interconnected devices, such as computers or transceivers, in which the topology and/or connectivity of the network may change at any time. Ad-hoc networks are advantageously used in circumstances where a plurality of devices desire or are required to communicate with each other.

Figure 9:
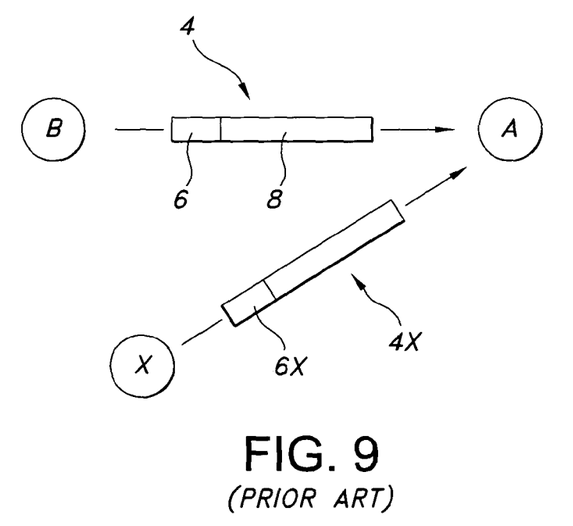
FIG. 9 is a schematic diagram of nodes in a known communications network under attack by an intruder.

In ad-hoc Networks there is a constant and continuous risk of intruders compromising the integrity of the network. For example, one type of known vulnerability to computers and networks is internet protocol (IP) spoofing. This is a technique used to gain unauthorized access to network nodes such as mobile computers or network devices such as routers. An example of IP spoofing is illustrated in FIG. 9, which depicts part of an ad-hoc network including node A and node B. A data packet or message 4 sent from node B to node A includes a header portion 6 and a data portion 8. Message 4 is shown as being sent directly from node B to node A, although the message may be sent through multiple nodes in the network prior to reaching node A. Header portion 6 typically includes the IP address of the message source as well as the IP address of the intended message recipient. Nodes between node B and node A in the network read the IP addresses and forward the message toward node A using various routing schemes. An intruder, shown in FIG. 1 as node X, obtains the IP address of node B using any of a variety of techniques. Node X incorporates the IP address of node B into a header portion 6X of a message 4X. When node A receives message 4X, node A reads header portion 6X and determines that message 4X has actually been sent by node B. Node A is thereby fooled, or spoofed, into believing a message from an intruder is from a trusted node. Such IP spoofing may analogously be applied to any non-internet ad-hoc network where a data packet header or a message detailing network topology or connectivity contains an identifier for one or more receiving nodes in the network.

Figure 10:
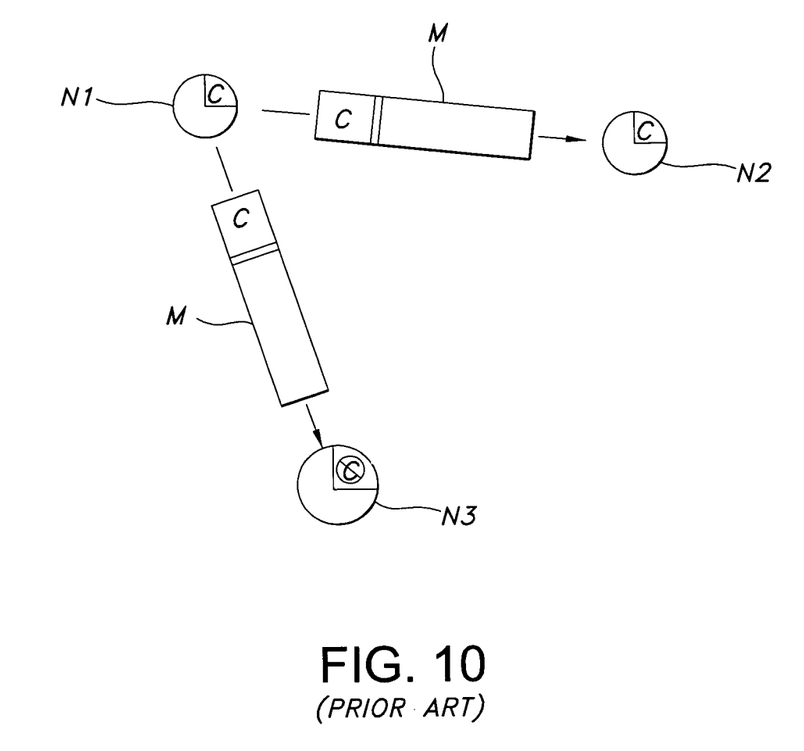
FIG. 10 is a schematic diagram of nodes in a known communications network.

Some networks do not use communications protocols that utilize source or destination information contained within transmitted messages; however, such networks may still be subject to spoofing attacks by intruders. For example, FIG. 10 depicts nodes N1, N2 and N3 of a wireless network in which messages broadcast by nodes in the network may not be intended for every node that can receive the messages. Each message, such as message M being broadcast from node N1, therefore includes a connection identifier C in a header of the message. Nodes N2 and N3 receive the message and read the connection identifier to see if the nodes are intended to process the message. In FIG. 10 node N2 recognizes the connection identifier in message M and processes the message, while node N3 does not recognize the connection identifier and does not process the message. If an intruder is able to obtain a connection identifier recognized by nodes in the network, the intruder may fool or spoof the nodes into believing the intruder is indeed part of the network.

To address and overcome problem of spoofing, nodes in the network must be able to detect and respond to intruders attempting to compromise the network. The challenge of spoofing, however, may be especially difficult to address in an ad-hoc network, where nodes are continuously entering and exiting the network. An intruder such as node X in FIG. 9 may easily obtain IP address or connection identifier information and fool any of the nodes in the network into accepting spurious and potentially harmful messages. What is needed is a method of detecting spurious messages in an ad-hoc network.

It is therefore an object of the invention to provide such a method of detecting spurious messages in an ad-hoc network.

Another object of the invention is to prevent unauthorized devices from successfully communicating on an ad-hoc network.

A feature of the invention is adding location information into messages sent through an ad-hoc network.

An advantage of the invention is added security in an ad-hoc network.

SUMMARY OF THE INVENTION

The invention provides a method of detecting messages from an unwanted source in an ad-hoc network. According to the method, a first message is received that purports to be from a mobile communication device. The first purported message, has a first location component incorporated therein. A second message is received that purports to be from the mobile communication device. The second message has a second location component incorporated therein. The first location component is compared with the second location component. It is determined that one of the first purported message and the second purported message is not from the mobile communication device when the first location component is inconsistent with the second location component.

The invention also provides a method of detecting an intruder in a communication network having a plurality of nodes. According to the method, a position of a first node is detected. The first node is mobile. The position of the first node is communicated to a second node in the network. A message purporting to be from the first node is received at the second node. The message contains a location identifier. The position of the first node and the location identifier are compared with movement characteristics of the first node. It is determined that the message is not from the first node when the location identifier is inconsistent with the position of the first node.

The invention further provides a communications device configured for use in an ad-hoc communications network. A communicating portion receives and sends messages from devices in the network. The messages include location information of another device in the network. A processing portion evaluates whether location information of the other device is consistent with previously received location information of the other device. The processing portion further determines that messages from the other device are not to be trusted when the location information is inconsistent with the previously received location information.

DETAILED DESCRIPTION OF THE DRAWINGS

Figure 1:
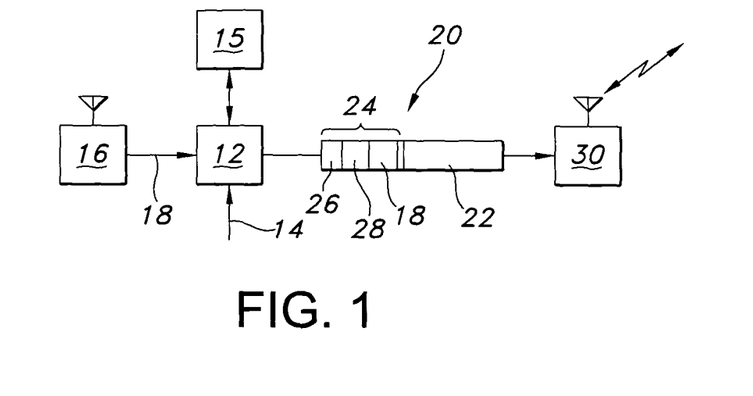
FIG. 1 is a schematic diagram of a node in a network using the intrusion detection system according to the invention.

The invention provides protection against address or identity-type spoofing, such as IP or connection identifier spoofing, in a mobile ad-hoc network by incorporating location information into messages transmitted through the network. FIG. 1 schematically depicts a basic communication device 10 configured to be a node in an ad-hoc network. Communication device 10 includes a processor 12 that receives, from various inputs, data 14 to be transmitted over the ad-hoc network. Data 14 may include information intended to be sent to one or more other nodes in the network, or may comprise protocol information necessary to communicate on the network. Processor 12 is operationally connected to a memory 15, which may be integral with or separate from the processor architecture. Processor 12 also receives inputs from a location device 16, which determines the location of communication device 10 at predetermined intervals. In a preferred embodiment the location device may comprise a GPS receiver that receives signals from earth-orbiting satellites or other sources and derives location information therefrom. Processor 12 incorporates data 14 as well as location information 18 from location device 16 into a message 20 organized according to protocols used on the ad-hoc network. According to the invention, message 20 includes a data portion 22 and a header portion 24, which includes a destination address 26, a source address 28, and location information 18 of the source. Destination address 26 and source address 28 are unique identifiers of the destination and source, respectively, and may comprise internet protocol (IP) addresses of the destination and source. Message 20 is sent to a transceiver 30, which transmits the message on the frequencies and with the communication techniques used by the ad-hoc network.

Figure 2:
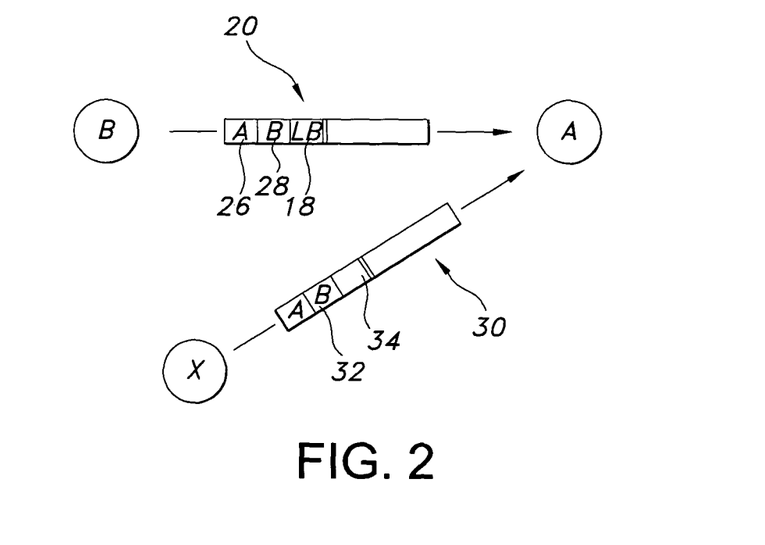
FIG. 2 is a schematic diagram of nodes in a network according to the invention.

FIG. 2 shows a portion of an ad-hoc network, including a node A and a node B. Node B, which may have the structure of communication device 10, transmits message 20 to node A. The destination address 26 indicates node A is the destination. The source address 28 indicates node B is the source. The location information 18 indicates a location LB of node B. An intruder, shown as node X, attempts to fool or spoof node A into thinking the messages node X sends are actually from a trusted source such as node B. To accomplish this objective node X obtains the source address of node B through various means and sends a message 30 that includes the source address 32 of node B. For location information 34, node X may send its own location LX, a location of node B obtained surreptitiously, or another location. When node A receives message 30 that purports to be from node B, node A compares location information 18 previously received in message 20 with location information 34 received in message 30, and determines whether the two items of received location information are consistent with each other. Node A may make this determination by evaluating whether node B could move between location LB and location LX in the lapsed time between the transmission/reception of message 20 and message 30. If node B could move between the two locations within the lapsed time, it is possible message 30 is actually from node B. However, if node B could not move between the two locations within the lapsed time, it is likely message 30 is not from node B. Node A could then take precautionary measures or even attempt to track down node X to ensure the spurious or spoofed messages are not processed.

Note that node A does not initially know whether message 20 or message 30 is received from a trusted source. Node A only knows that there is an inconsistency between the locations LB and LX received in the two messages. For this reason, one precautionary measure is that once node A has determined node B is under attack or being mimicked, node A may block all messages purporting to be from node B for a predetermined amount of time. Alternatively, node A may send a message to some or all nodes in the network, instructing the other nodes to block all messages from node B for a predetermined amount of time.

To evaluate whether node B could move between location LB and location LX within the transmission/reception times of messages 20 and 30, it may be helpful for node A to know one or more movement or performance characteristics of the vehicle or person associated with node B. Such characteristics could include the type of vehicle, current velocity, maximum possible velocity, direction of movement, current altitude, time and/or distance required to change direction, or turn radius of the vehicle or person. For example, if node B is a hand-held receiver moving with a person walking at 3 miles an hour, node A would know it is being spoofed or under attack if it received two messages indicating a position change for node B of one mile in one second. If node B is instead mounted in an aircraft flying north at 500 miles per hour, node A would know it is being spoofed or under attack if it received two messages indicating node B had moved to a position requiring a near-instantaneous south-ward change in direction. Additionally, if node B is mounted in a truck driving along a road or other known transportation route, node A may conclude it is being spoofed if it received a message indicating node B was transmitting 400 yards off the road.

Figure 3:
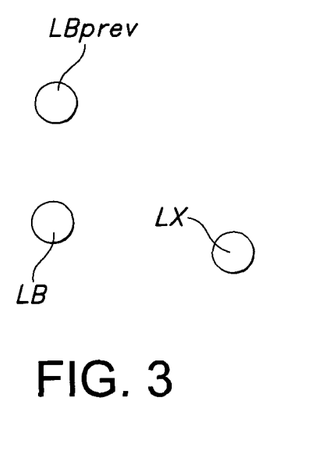
FIG. 3 is a schematic diagram of nodes in a network according to an embodiment of the invention.

The movement and performance characteristics may be communicated directly in the header of messages transmitted by node B. Alternatively, the movement and performance characteristics may be inherent in the type of vehicle in which the node is moving, and a knowledge of the vehicle type associated with node B may communicate the necessary movement and performance characteristics to be used in detecting a network intruder. In addition, the characteristics may be independently derived by node A using previously received location information of node B. As schematically shown in FIG. 3, node B indicated it was at location $LB_{prev}$ when a previous, message was sent, and indicated it was at location LB when a current message was sent. If the time difference between the two messages is known, the speed, direction, and change in altitude can easily be derived. Such derived characteristics can then be compared with the known performance characteristics of the person or vehicle associated with the node to determine if a location LX, purporting to be a location of node B, is consistent with the known and/or predicted movement patterns of node B. Alternatively or additionally, the derived characteristics can be compared with the known performance characteristics, e.g., maximum velocity, to determine if the derived characteristics are consistent therewith.

Figure 4:
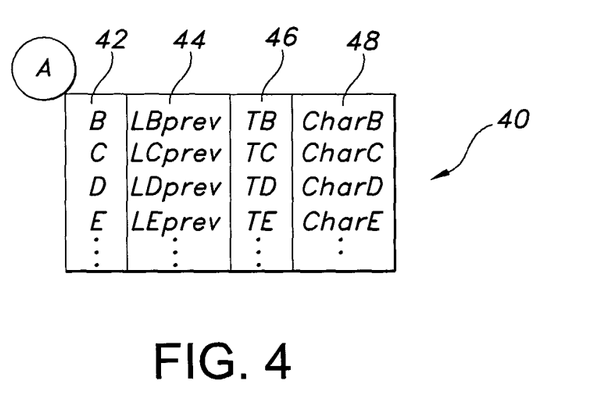
FIG. 4 is a schematic diagram of a node in a network according to an embodiment of the invention.

To keep track of the information necessary to determine whether the communicated locations of nodes in the network are consistent with previously communicated locations and with performance characteristics, node A ideally maintains in memory 15 an information database of locations and characteristics of other nodes. One embodiment of such a database is shown in FIG. 4 as a look-up table 40. The table has sufficient space to maintain information on each source node that has sent a message to node A. For each source node, the table includes entries for: at 42, a node identifier, such as an IP address; at 44, a location of the node received in a previous message; at 46, the time the previous message was received; and at 48, one or more movement and/or performance characteristics of the node. The information maintained in table 40 is accessed whenever a message is received that contains location information for a node communicating with node A.

Figure 5:
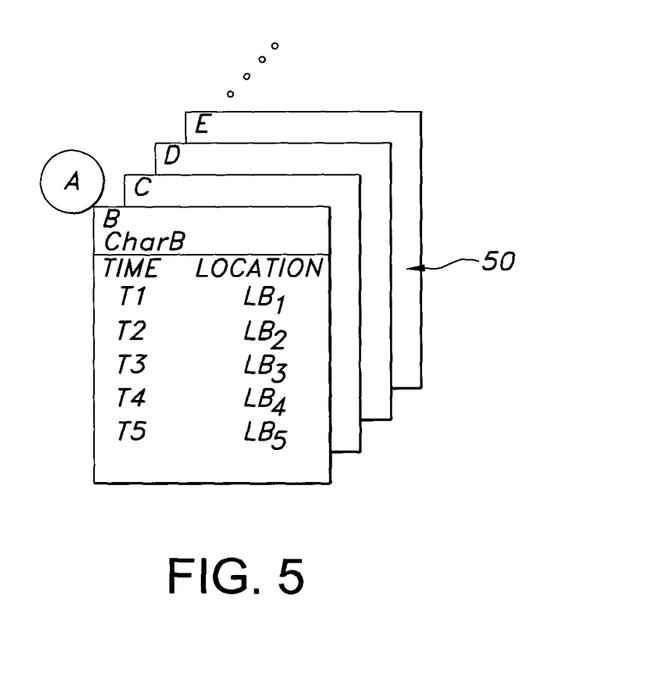
FIG. 5 is a schematic diagram of a node in a network according to another embodiment of the invention.
Figure 6:
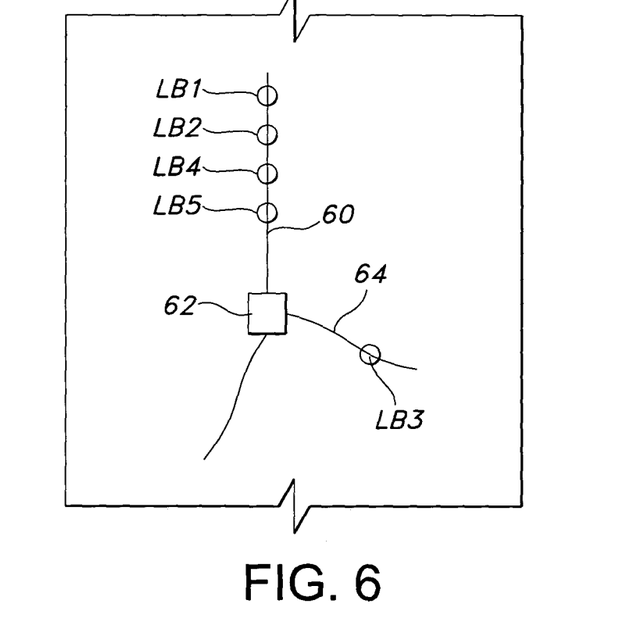
FIG. 6 is, a schematic diagram of nodes in a network according to the embodiment of the invention shown in FIG. 6.

It may be necessary or desirable for nodes in the network, such as node A, to store multiple previous locations of each node instead of a single previous location as described with respect to FIG. 4. FIG. 5 shows another embodiment of the invention in which a look-up table 50 stores multiple locations LB1, LB2, LB3, etc. of node B, received at successive times T1, T2, T3, etc., respectively. Such information is maintained for each node communicating with node A. Multiple location information may be used in determining performance characteristics such as rate of change of speed, turn radius, and the like. Also, the multiple location information can be used to more definitively determine whether a received location of a node is consistent with previously received location information. For example, FIG. 6 shows a schematic representation of multiple received locations of node B superimposed upon a map. The combined locations LB1, LB2, LB4, and LB5 indicate consistent southward movement of node B along a highway 60 toward a city 62. LB3, on the other hand, indicates a position of node B on a separate highway 64. As LB3 was transmitted at time T3, which is between T2 and T4, it is highly unlikely that node B was ever at location LB3, and it is likely that the message carrying LB3 is spurious. Evaluating multiple previous locations of transmitting node therefore may enable a receiving node to determine not only the presence of a spoofing node, but also the precise message or messages that are spurious. Such evaluation enables the receiving node to discard the spurious messages and use the authentic messages from trusted nodes without disregarding all communications from the trusted node.

Figure 7:
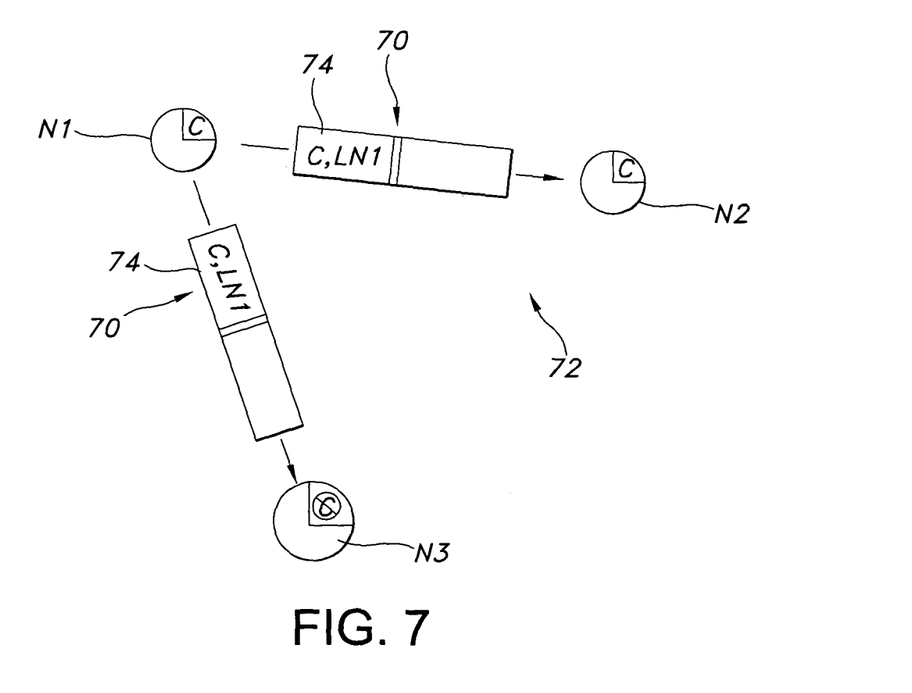
FIG. 7 is a schematic diagram of nodes in a network according to another embodiment of the invention.

The invention has been described herein in the context of a network of nodes that include source and destination information in the headers of messages sent through the network. However, the invention may equally be used with network protocols where information on specific source and/or destination nodes is transmitted. FIG. 7 depicts a message 70 broadcast from a node N1 in a wireless network 72. Message 70 includes a connection identifier C in a header 74 of the message. Location information LN1 is also incorporated into the header of the message as previously discussed herein. Nodes N2 and N3, which are part of wireless network 72, receive message 70 broadcast by node N1 and read the connection identifier to see if the nodes are intended to broadcast the message. Although only N2 is shown as capable of recognizing the connection identifier and processing the message 72, either node N2 or node N3 may determine whether location information LN1 is consistent with previous transmitted locations of node N1 as described herein, to thereby detect any spoofing activity.

Figure 8:
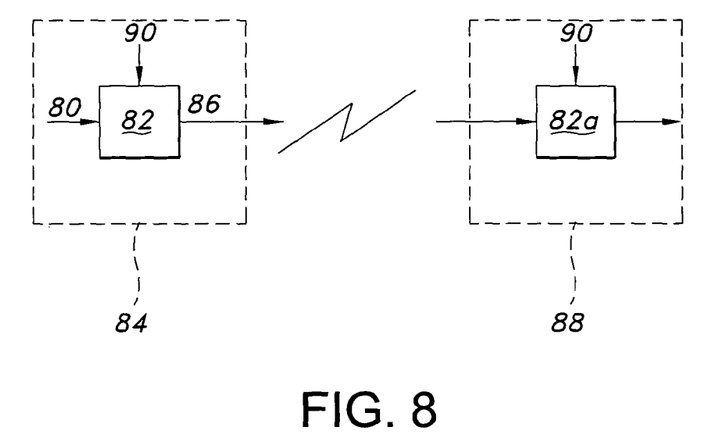
FIG. 8 is a schematic diagram of nodes in a network according to still another embodiment of the invention.

The location information inserted into messages as disclosed herein may take the form of uncoded data communicating a latitude/longitude or cell location of a node, but preferably such data is encrypted to maintain the security of the data. More preferably, the location information is further secured by transmitting a code representative of the location information. FIG. 8 graphically depicts a process in which location information 80, such as latitude/longitude data or cell location data, is input into an algorithm 82 resident at a first node 84. The algorithm creates a location-dependent code 86 that is transmitted to a second node 88. Second node 88 uses an algorithm 82a that is the same or related to algorithm 82 to extract the location information in a usable form from the location-dependent code. If desired, a variable alphanumeric key 90, which is preferably a rapidly changing pseudo-random value, may be input into algorithms 82, 82a so that the location-dependent code 86 is also derived from a variable element independent of the location of a transmitting node. Regardless of the algorithm involved and the encryption strategies employed, location-dependent code 86 is still considered location information, a location component, or a location identifier as described herein.

The invention thus far has described inserting location information into a data message. However, such location information may also be inserted into other types of messages sent through an ad-hoc network. For example, as an ad-hoc network is constantly changing due to nodes entering and exiting the network, the topology and connectivity of the network constantly change as well. Optimal routing strategies may therefore need to be updated on a regular basis, and messages may be periodically transmitted throughout the network communicating such routing updates. Location information for affected nodes in the routing update may be incorporated into routing update messages, and routing hardware may therefore detect the presence of spurious messages as disclosed herein.

The invention as described herein provides a method for detecting an intruder or spoofer in an ad-hoc network where one or more nodes in the network are mobile. An advantage of the invention is that because a node is constantly and dynamically changing location, the ability of a malicious intruder to spoof or mimic the node without detection is significantly deteriorated.

Another advantage is that cryptographic techniques may be used to strengthen the integrity and confidentiality of the location information.

Still another advantage of the invention is that at least some of the movement and performance characteristics, describing current and potential movements of a person or vehicle associated with the node, may be derived from the location information received from transmitting nodes.

Yet another advantage is that the invention may be implemented without substantially modifying known network, computer, or transceiver designs.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. In an ad-hoc network, a method of detecting messages from an unwanted intruder, the method comprising:
   receiving a first message purporting to be from a mobile communication device in the ad-hoc network, the first message having a first location component incorporated therein;
   receiving a second message purporting to be from the mobile communication device, the second message having a second location component incorporated therein;
   determining movement based upon the first location component and the second location component; and
   determining whether at least one of the first message and the second message is from the intruder by comparing the movement with a distance required for the mobile communication device to change direction, wherein the distance required for the mobile communication device to change direction is determined based on physical movement capabilities of a vehicle or person with which the mobile communication device is associated and the distance required for the mobile communication device to change direction is stored in a database, and wherein determining whether at least one of the first message and the second message is from the intruder comprises determining that at least one of the first message and the second message is from the intruder when the movement and the distance required for the mobile communication device to change direction indicate that the mobile communication device could not have changed direction quickly enough to travel from a location associated with the first location component to a location associated with the second location component.

2. The method of claim 1, wherein the at least one of the first and second messages further provides information relating to one of a topology and a connectivity of the ad-hoc network.

3. The method of claim 1, further comprising:
   receiving a third message purporting to be from the mobile communication device, the third message having a third location component incorporated therein;
   comparing the third location component with the first and second location components; and
   determining which of the first, second and third messages is from the unwanted intruder.

4. The method of claim 1, wherein determining whether at least one of the first message and the second message is from the intruder further comprises comparing the movement with a turning radius.

5. The method of claim 1, wherein the mobile communication device is a first mobile communication device, and wherein the first message is received by a second communication device, and further wherein the first and second devices are nodes in the ad-hoc network.

6. The method of claim 1, wherein determining whether at least one of the first message and the second message is from the intruder further comprises comparing at least one of the first location component, the second location component, and the movement with known transportation routes.

7. The method of claim 1, further comprising:
   initiating a response when it is determined that at least one of the first message and the second message is from the intruder.

8. The method of claim 7, wherein the response includes disregarding messages purporting to be from the mobile communication device.

9. The method of claim 1, wherein a device type of the mobile communications device includes at least one of a hand-held mobile communications device, an aircraft-mounted mobile communications device and a road-vehicle-mounted mobile communications device.

10. A method of detecting an intruder in a communication network having a plurality of nodes, wherein a position of a first node is determined, the first node being mobile, the method comprising:
    receiving the position of the first node at a second node in the network;
    determining movement of the first node;
    receiving at the second node a message purporting to be from the first node, the message containing a location identifier; and
    determining whether the message is from the intruder by comparing a location associated with the location identifier with the position of the first node, the movement of the first node, and a distance required for the first node to change direction, wherein the distance required for the first node to change direction is stored in a database and is determined based on physical movement capabilities of a vehicle or person with which the first node is associated, and wherein determining whether the message is from the intruder comprises determining that the message is from the intruder when the movement of the first node and the distance required for the first node to change direction indicate that the first node could not have changed direction quickly enough to travel from the received position of the first node to the location associated with the location identifier of the message.

11. The method of claim 10, wherein the position of the first node is communicated to the second node by incorporating the position of the first node into a data packet transmitted from the first node to the second node.

12. The method of claim 10, wherein the position of the first node is communicated to the second node by incorporating the position of the first node into a transmission sent between nodes in the network, wherein the transmission provides information relating to one of a topology and a connectivity of the nodes within the network.

13. The method of claim 10, wherein determining whether the message is from the intruder comprises comparing at least one of the location associated with the location identifier, the position of the first node, and the movement of the first node with an altitude.

14. The method of claim 10, wherein the position communicated to the second node is one of a plurality of successive positions of the first node that are communicated to the second node, and further wherein the plurality of successive positions are compared with the location identifier to determine that the message is not from the first node when the location identifier is inconsistent with the plurality of successive positions of the first node.

15. The method of claim 10, further comprising:
    disregarding communications from the first node when the message is not from the first node.

16. A communications device configured for use in an ad-hoc communications network, the device comprising:

a communicating portion that receives messages from devices in the ad-hoc communications network and sends messages to devices in the ad-hoc communications network, the messages including location information of another device in the network;

a processing portion configured to determine whether messages from another device can be trusted based on a plurality of messages received at the communications device that were purportedly sent from said another device, each of the plurality of messages including a location component, wherein the processing portion is configured to compare the location components of at least two of the plurality of messages with a distance required for said another device to change direction, wherein the distance required for said another device to change direction is stored in a database determined based on physical movement capabilities of a vehicle or person with which said another device is associated, and wherein the processing portion is configured to determine that messages from said another device cannot be trusted when the comparison of the location components of the at least two messages and the distance required for said another device to change direction indicates that said another device could not have changed direction quickly enough to travel between locations associated with the location components of the at least two messages.

17. The communications device of claim 16, further comprising:

a memory portion configured to store the previously received location information.

18. The communications device of claim 17, wherein the previously received location information comprises information relating to a plurality of previous locations of said another device.

19. The communications device of claim 17, wherein the memory portion is further configured to store a time when the previously received location information was transmitted by said another device.

20. The communications device of claim 17, wherein the memory portion is further configured to store at least one of a plurality of characteristics of said another device, said plurality of characteristics describing at least one of movement and performance of said another device.

* * * * *